(12) United States Patent
Karlsson et al.

(10) Patent No.: US 10,154,418 B2
(45) Date of Patent: Dec. 11, 2018

(54) METHOD AND ARRANGEMENT RELATED TO INTERFERENCE BETWEEN SYSTEMS

(75) Inventors: Jorgen Karlsson, Sundbyberg (SE); Konstantinos Dimou, Stockholm (SE); Sverker Magnusson, Stockholm (SE); Olav Queseth, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 767 days.

(21) Appl. No.: 14/117,953

(22) PCT Filed: May 16, 2011

(86) PCT No.: PCT/SE2011/050613
§ 371 (c)(1),
(2), (4) Date: Nov. 15, 2013

(87) PCT Pub. No.: WO2012/158077
PCT Pub. Date: Nov. 22, 2012

(65) Prior Publication Data
US 2014/0094165 A1   Apr. 3, 2014

(51) Int. Cl.
*H04W 24/02* (2009.01)
*H04W 16/14* (2009.01)
(Continued)

(52) U.S. Cl.
CPC ......... *H04W 24/02* (2013.01); *H04W 16/14* (2013.01); *H04W 28/04* (2013.01); *H04W 28/20* (2013.01); *H04W 72/00* (2013.01)

(58) Field of Classification Search
None
See application file for complete search history.

(56) References Cited

U.S. PATENT DOCUMENTS

| | | | |
|---|---|---|---|
| 8,934,500 B2 * | 1/2015 | Love | H04W 72/1215 370/466 |
| 9,565,655 B2 * | 2/2017 | Love | H04W 72/00 |

(Continued)

FOREIGN PATENT DOCUMENTS

| | | |
|---|---|---|
| EP | 1841252 A2 | 10/2007 |
| WO | 03001742 A1 | 1/2003 |

(Continued)

OTHER PUBLICATIONS

Liu, Y., et al., "Energy Detection Threshold Optimization for Cooperative Spectrum Sensing", Advanced Computer Control (ICACC), 2010 2nd International Conference on, vol. 4, Mar. 27-29, 2010, pp. 566-570.

(Continued)

*Primary Examiner* — Hilina K Demeter
(74) *Attorney, Agent, or Firm* — Rothwell, Figg, Ernst & Manbeck, p.c.

(57) ABSTRACT

Methods and arrangements for use in a respective node and mobile terminal in a first system associated with a first frequency band for radio communication, for supporting avoiding or reducing interference in a second frequency band associated with a second system, which second frequency band is adjacent to the first frequency band. The method for use in the node comprises detecting activity of the second system in the second frequency band and adjusting the bandwidth used by the node for communication, based on characteristics of the detected current activity of the second system in the second frequency band, such that interference to the second frequency band, from radio communication associated with the node, is adapted to the second system activity in said second frequency band. The method further comprises providing information of said adjustment to at least one mobile terminal. Further, information of said adjustment could be provided to neighboring nodes.

14 Claims, 15 Drawing Sheets

(51) Int. Cl.
H04W 28/20 (2009.01)
H04W 72/00 (2009.01)
H04W 28/04 (2009.01)

(56) References Cited

U.S. PATENT DOCUMENTS

| | | |
|---|---|---|
| 2007/0147226 A1 | 6/2007 | Khandekar et al. |
| 2008/0161033 A1* | 7/2008 | Borran .................. H04W 52/16 455/522 |
| 2010/0165827 A1* | 7/2010 | Kim ...................... H04W 16/14 370/201 |
| 2010/0234040 A1* | 9/2010 | Palanki ............... H04W 52/244 455/452.2 |

FOREIGN PATENT DOCUMENTS

| | | |
|---|---|---|
| WO | 2007050921 A2 | 5/2007 |
| WO | 2010137777 A1 | 12/2010 |
| WO | 2011066787 A1 | 6/2011 |
| WO | WO 2011128879 A1 * | 10/2011 |

OTHER PUBLICATIONS

Extended European Search Report dated Oct. 19, 2015 in corresponding European application No. 11865810.3, 6 pages.

* cited by examiner

METHOD AND ARRANGEMENT RELATED TO INTERFERENCE BETWEEN SYSTEMS

CROSS-REFERENCE TO RELATED APPLICATION

This application is a 35 U.S.C. § 371 National Phase Application from PCT/SE2011/050613, filed May 16, 2011, and designating the United States.

TECHNICAL FIELD

The invention relates to a method and arrangement for handling of interference between systems using adjacent frequency bands.

BACKGROUND

Modern communication systems, such as e.g. UMTS (Universal Mobile Telecommunications System), LTE (Long Term Evolution) and LTE-A (Advanced) cause a significantly higher amount of out-of-band interference into adjacent frequency bands than earlier "legacy" communication systems, such as e.g. GSM (Global System for Mobile communications). Such out-of-band interference is also sometimes referred to as "interference leakage". The main reason for this out-of-band interference is that modern systems typically employ larger, or wider, bandwidth(s) than legacy systems, and that it is more difficult to develop filters which can cut the out-of-band emissions for a relatively large bandwidth than for a relatively narrow bandwidth.

This significantly higher amount of out-of-band interference or emissions may result in violation of e.g. regulations concerning interference caused to other systems, which employ frequency bands adjacent to the frequency band(s) employed by the interference generating, or "disturbing" systems. Examples of systems using spectrum bands which are adjacent to, or are anticipated to be adjacent to, the frequency bands used by e.g. UMTS, LTE and LTE-A in some countries, and thus may be subjected to out-of-band interference from these systems, are e.g.:

- the radio navigation and communication systems between airplanes and the ground, such as DME (Distance Measuring Equipment) (962-1213 MHz) and future L-DACS (L-band Digital Aeronautical Communication System) (960-1164 MHz)
- the communication/control system used for communication with and control of trains GSM-R (Railway) (873-880/918-925 MHz in Europe)

For example, in Europe, an LTE system may use the 900, 1800, and/or 2600 MHz bands. Thus, e.g. an LTE system DL (DownLink) transmission in the 900 MHz frequency band may cause interference to transmissions within the DME or L-DACS systems used for communication with, or control of, e.g. airplanes. Such a scenario is illustrated in FIG. 1. Thus, in a worst case scenario, the out-of-band interference from the LTE DL transmission may e.g. interrupt or disturb important airplane control commands.

A number of solutions have been proposed to mitigate interference between systems using adjacent frequency bands. Most of these proposed solutions focus on the use of a (static) low transmit power in the system causing out-of band interference, or on the use of fixed so-called "guard bands" between the adjacent frequency bands used by different systems or operators. By guard band is meant a frequency band which is not used for communication, but as a buffer for out-of-band interference caused by the systems employing the frequency bands surrounding the guard band. The wider frequency bands used by the systems, the wider guard bands are needed to avoid interference between the systems.

These proposed prior art solutions, however, may cause e.g. coverage problems when the (static) transmit power is too low, and, may further be inefficient e.g. in terms of radio resource usage, by the use of unnecessarily large guard bands based on a worst-case scenario. Further, bandwidth is a scarce resource that is very valuable to the respective authorities or organizations controlling the frequency spectrum in each country. Thus, at least for economical reasons, reserving wide guard bands between systems using adjacent frequency bands is not an attractive idea.

SUMMARY

It would be desirable to obtain an improved handling of interference between systems using adjacent frequency bands. It is an object of the invention to enable an improved handling of interference between systems using adjacent frequency bands. It is further an object of the invention to provide an efficient method and arrangement for avoiding or reducing interference from a first system to a second system using an adjacent frequency band.

According to a first aspect, a method is provided to be performed in/by a node in a first system associated with a first frequency band for radio communication, for avoiding or reducing interference in a second frequency band associated with a second system, which second frequency band is adjacent to the first frequency band. The method comprises detecting activity of the second system in the second frequency band and determining the characteristics of the current activity of the second system in the second frequency band. The method further comprises adjusting the bandwidth used for radio communication by the node, based on said characteristics, such that interference to the second frequency band, from radio communication associated with the node, is adapted to the second system activity in said second frequency band. The method further comprises providing information of the bandwidth adjustment to at least one mobile terminal being served by the node.

According to a second aspect, an arrangement is provided for use in a node in a first system associated with a first frequency band for radio communication, for avoiding or reducing interference in a second frequency band associated with a second system which second frequency band is adjacent to the first frequency band. The arrangement comprises a functional unit adapted to detect activity of the second system in the second frequency band. The arrangement further comprises a functional unit adapted to determine the characteristics of the second system current activity in the second frequency band. Further, the arrangement comprises a functional unit adapted to adjust the bandwidth used by the node for communication, based on said characteristics, such that the interference to the second frequency band is adapted to the second system activity in said second frequency band. The arrangement further comprises a functional unit adapted to provide information related to the bandwidth adjustment to at least one mobile terminal served by the node, thus enabling continued service of said at least one mobile terminal.

According to a third aspect, a method is provided to be performed in/by a mobile terminal in a first system associated with a first frequency band, etc, as described above. The method comprises receiving information from a node serving the mobile terminal, related to an adjustment of the bandwidth used by said node for communication and adapting at least one parameter related to channel estimation based on the received information.

According to a fourth aspect, an arrangement is provided for use in a mobile terminal in a first system associated with a first frequency band, etc, as described above. The arrangement comprises a functional unit adapted to receive information related to an adjustment of the bandwidth used for communication by a node serving the mobile terminal. The arrangement further comprises a functional unit adapted to adapt at least one parameter related to channel estimation, based on the received information.

The above method and arrangement provide the advantage that interference e.g. from mobile system BSs (Base Stations/eNBs) and/or UEs (User Equipment) to adjacent system services may be avoided or reduced by taking appropriate actions only when and where this is needed, without sacrificing bandwidth and/or transmission power more than necessary, and that interference from mobile system BSs to adjacent services is avoided without generating problems in the UE measuring within the affected cells. In addition, the size of the temporary guard band can be larger than what is possible with current solutions. Dynamic information about the interference scenarios may be used, and unnecessary worst-case assumptions can be avoided and the constraints on the interfering system can be minimized. The dynamic modifications to the interfering system may be selected as the alternative method that will minimize e.g. the QoS degradation of the interfering system, according to some objective function.

The above methods and arrangements may be implemented in different embodiments. For example, the information related to the bandwidth adjustment may comprise one or more of: an indicator of an allowed measurement bandwidth, selected based on the adjusted bandwidth, for the mobile terminal; an indicator of the bandwidth used for communication by the node after the adjustment of the bandwidth; and an indicator of the absolute or relative change in bandwidth. In some embodiments, the information related to the bandwidth adjustment may further comprise a specification of a location of one or more of: the allowed measurement bandwidth; the bandwidth used for communication by the node after the adjustment; and, a frequency band which will no longer be used for communication by the node after the bandwidth adjustment.

The information related to the bandwidth adjustment may further be provided to at least one neighbor node, such that said neighbor node may provide information related to the bandwidth adjustment to at least one mobile terminal served by said neighbor node, thus enabling continued service of said at least one mobile terminal.

The at least one parameter related to channel estimation, which is adapted in the method and arrangement according to the third and fourth aspect may be one or more of: the measurement bandwidth in which the mobile terminal performs measurements for channel estimation; and, the location of the measurement bandwidth.

According to a fifth aspect, a network node is provided for use in a cellular communication system, said network node comprising an arrangement according to the second aspect.

According to a sixth aspect, a mobile terminal is provided for use in a cellular communication system, said mobile terminal comprising an arrangement according to the fourth aspect.

The embodiments above have mainly been described in terms of methods. However, the description above is also intended to embrace embodiments of the arrangements and network node/mobile terminal, adapted to enable the performance of the above described features. The different features of the exemplary embodiments above may be combined in different ways according to need, requirements or preference.

BRIEF DESCRIPTION OF THE DRAWINGS

The invention will now be described in more detail by means of exemplary embodiments and with reference to the accompanying drawings, in which.

DETAILED DESCRIPTION

Briefly described, a solution is provided for avoiding interference between systems using adjacent frequency bands. The solution is dynamic, and thus enables e.g. improved utilization of bandwidth resources, as compared to prior art solutions. The provided solution involves dynamic adaptation of the amount of generated out-of-band interference, based on the actual activity in an adjacent frequency band. A system employing a method and arrangement according to an exemplifying embodiment may be described as keeping a "dynamic interference margin" to a system using an adjacent frequency band, and/or as creating a "temporary guard band" to the latter.

Within this document, the expression "a disturbing system" will be used as referring to a system generating out-of-band interference into an adjacent frequency band. Further, the expression "a disturbed system" will be used as referring to a system associated with a frequency band into which a disturbing system generates interference. A disturbed system does not need to be literally disturbed by interference generated by a disturbing system. Further, two "adjacent" frequency bands may or may not be separated by some further frequency band, and still be adjacent.

Figure 1:
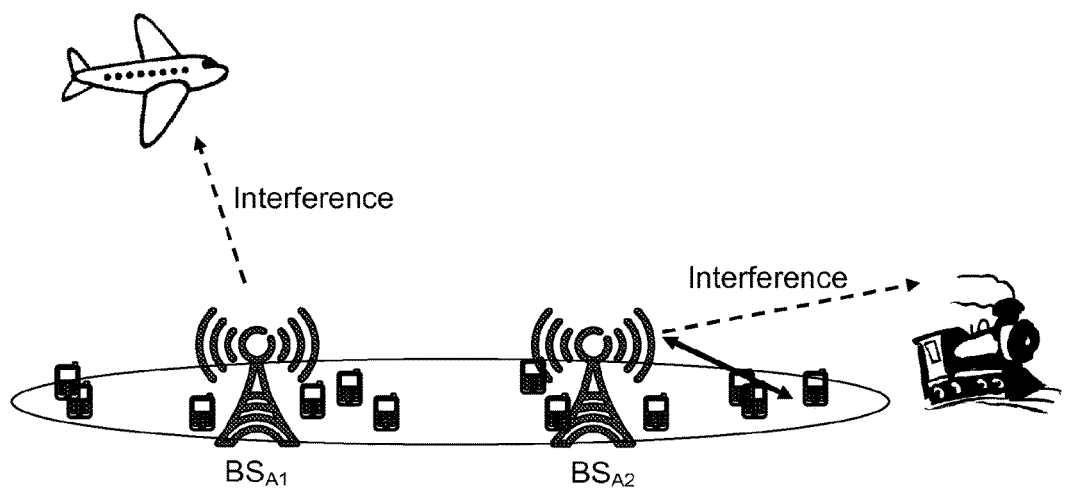
FIG. 1 illustrates a scenario where a cellular communication system may interfere with other systems, such as control systems for planes and trains, according to the prior art.

An easily comprehensible example of where the suggested solution may be employed is e.g. in a base station "$BS_A$" of a cellular communication system "A", where the base station "$BS_A$" is located in a geographical area in close vicinity of an airport or a railway line, as illustrated in FIG. 1, where the frequency band used by the cellular communication system "A" is adjacent to the frequency band(s) used by the airplane or train communication/control system. The activity in the airplane or train communication/control system will be closely related to the presence of airplanes landing or taking off, or of trains passing by. During periods, there will most probably be no plane or train activity, and thus no activity in these communication/control systems.

Typically there are requirements and rules for how much out-of-band interference a communication system may generate. However, theoretically, the base station "$BS_A$" could be allowed to cause "unlimited" out-of-band interference when there is no activity in the airplane or train communication/control system in the example above, since there is no activity which may be disturbed by such interference, and consequently no interference margin to the adjacent frequency band(s) is required. The out-of-band interference generated by "$BS_A$" could then be adapted based on the actual level of activity in the airplane or train communication/control system.

Figure 2A:
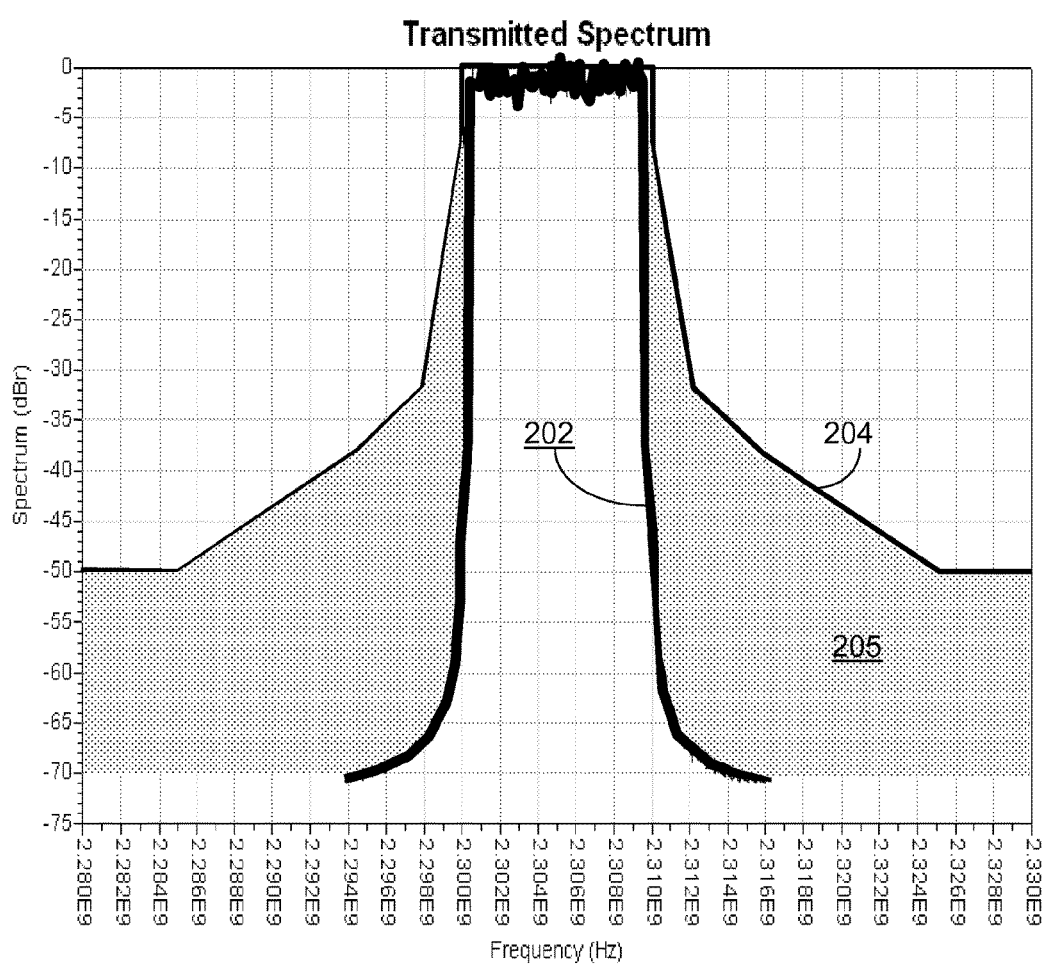
FIGS. 2a is a diagram showing an ideal system frequency spectrum (bold line), and an actual system frequency spectrum (thin line).

An example of a frequency band 202 associated with a system "A" is outlined in FIG. 2a with a bold solid line. The frequency band 202 may e.g. be reserved for the system "A", e.g. by that an operator of the system "A" has acquired a license for the frequency band 202 at an auction or similar. The actual frequency band 204, which is affected by communication within system "A" in said frequency band 202, is outlined with a thin solid line (204). The out-of-band interference is thus the shaded area 205 outside the frequency band 202, which comprises signal energy associated with the system "A".

Thus, when it is detected that an airplane or a train is approaching, a parameter or operating condition in the base station "$BS_A$" may be adjusted such that the communication of said approaching airplane or train will not be disturbed by out-of-band interference caused by base station "$BS_A$" communication. Information on the arrival of an airplane or a train can be obtained by the base station "$BS_A$" in a number of ways. For example, such information could be provided directly from the airplane/train control systems, or, the base station "$BS_A$" could be provided with functionality for obtaining information regarding approaching trains/airplanes either by measuring e.g. received signal strength, receiving reports of measurements performed by other nodes in system A, or, by decoding information from an airplane/train communication channel.

Based on knowledge of parameters, such as, e.g., the position of an airplane or train "B", the estimated distance from the airplane or train "B" to the base station "$BS_A$", the velocity and/or the typical behavior of "B", one or more transmission parameters of the base station may be adjusted during e.g. a given time period, or until the airplane or train "B" has "moved on" or been safely landed.

Figure 2B:
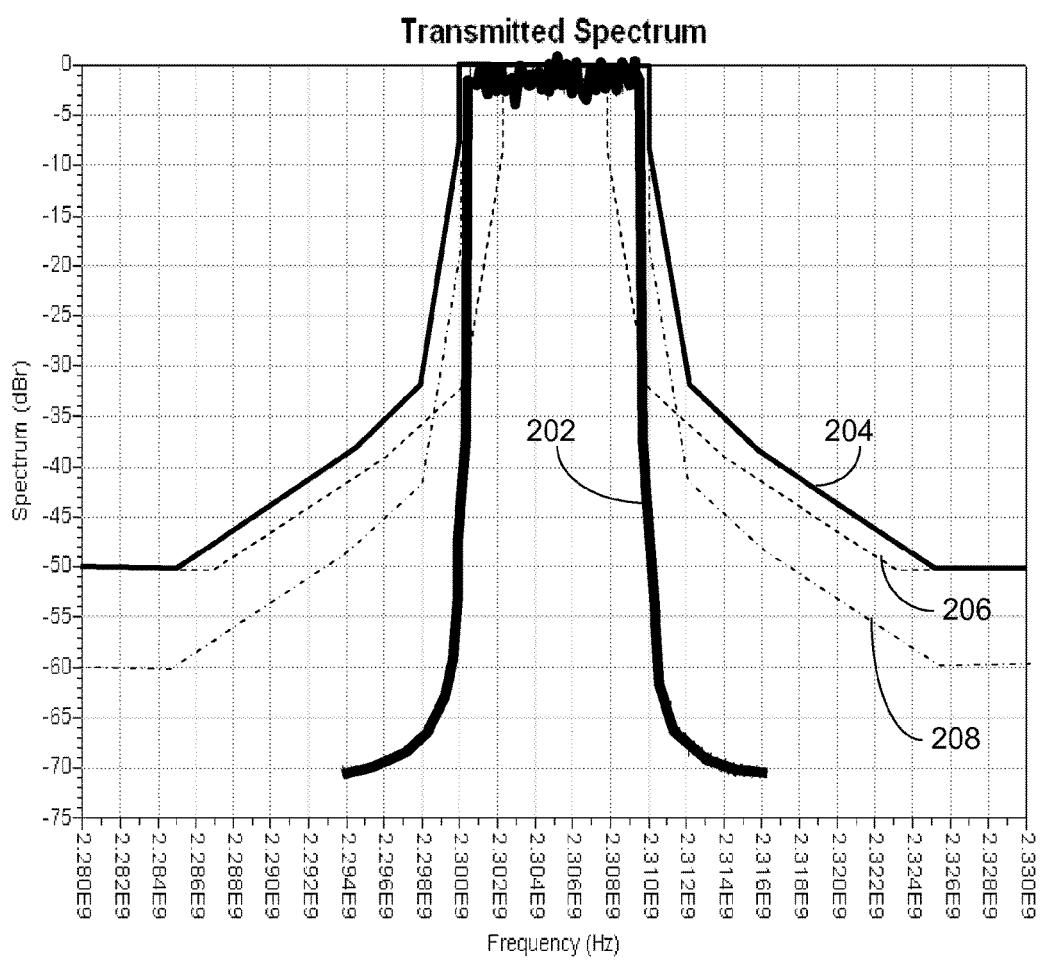
FIGS. 2b is a diagram showing examples of modified out-of-band interference (dashed and dash-dotted lines) as compared to the out of band interference shown in FIG. 2 (thin solid line), according to exemplifying embodiments.

The base station "$BS_A$" could be provided with information on how the out-of-band performance of the base station "$BS_A$" depends on, or is affected by, the adjustment of different parameters related to radio communication. Having access to such information enables the base station "$BS_A$" to "optimize" the adjustment, i.e. to adjust a parameter or combination of parameters such that a sufficient reduction of the out-of-band interference is provided while maintaining the best possible performance of base station communication. A "sufficient reduction" could be e.g. a reduction which reduces the interference to a level which complies with predefined regulations. Some examples of how the out-of-band interference may be adapted or adjusted are illustrated in FIG. 2b and outlined with a dashed line 206 and a dash-dotted line 208, respectively. If starting with the out-of-band interference outlined by line 204 (205 in FIG. 2a), the out-of-band interference in accordance with the dashed outline 206 may be accomplished e.g. by changing the filter characteristics of an adaptive filter in a node in system "A". The out-of-band interference in accordance with the dash-dotted outline 208 may be accomplished by e.g. lowering the transmit power of a system node, and/or e.g. tilting the transmit antenna(s) associated with said node downwards.

Other examples of parameters which may be taken into consideration when deciding which parameter(s) to adjust and to which extent are e.g. the number of mobile terminals or UEs served by the base station in question, and further, the power requirements of said UEs resulting from e.g. the UEs' distance from the base station and/or the service(s) utilized by the UEs.

Further, signal characteristics of the interfered system, such as e.g. the interfered system bandwidth and/or frequency usage, may be considered when adapting the out-of-band interference by adjusting an operational condition or parameter in a node, such as e.g. $BS_A$, in the interfering cellular communication system "A". Taking the signal characteristics of the interfered system into consideration could affect the size or extension of the dynamic interference margin or temporary guard band. This and other aspects of the suggested solution will result in an efficient use of radio resources, due to that the dynamic interference margin to the possibly interfered system will be only as wide as necessary during current conditions.

Moreover, knowledge of the interfered system characteristics and temporary and geographical situation can be used so as to reduce the degradation of the mobile system (e.g. LTE). As an example, the interfered system at a given location can handle high interference from the mobile system within some repetition, e.g. every 1 ms every X ms, etc. For example, the interfered, or "victim", system may use error correcting codes that may compensate for short time error bursts such that the victim system performance is not affected by such bursts; or, the victim system may be discontinuously connected, e.g. using some TDM scheme.

The adaptation of the out-of-band interference, or "interference leakage", to current activity and conditions in a system using an adjacent frequency band could be achieved in different ways. For example, the antenna patterns of one or more nodes in the disturbing system could be dynamically adapted, e.g. by antenna tilting or other beam redirection/reconfiguration methods. The main or central antenna beam could be redirected such as to avoid creating interference towards e.g. one or more entities of the disturbed system, such as approaching airplanes, trains or UEs, when such vehicles and/or terminals are detected in the area. Changing the antenna pattern e.g. by tilting the antennas will change the power of out-of-band emissions reaching a certain geographic area, which is one possible way to achieve a dynamic interference margin to an interfered system.

Figure 8:
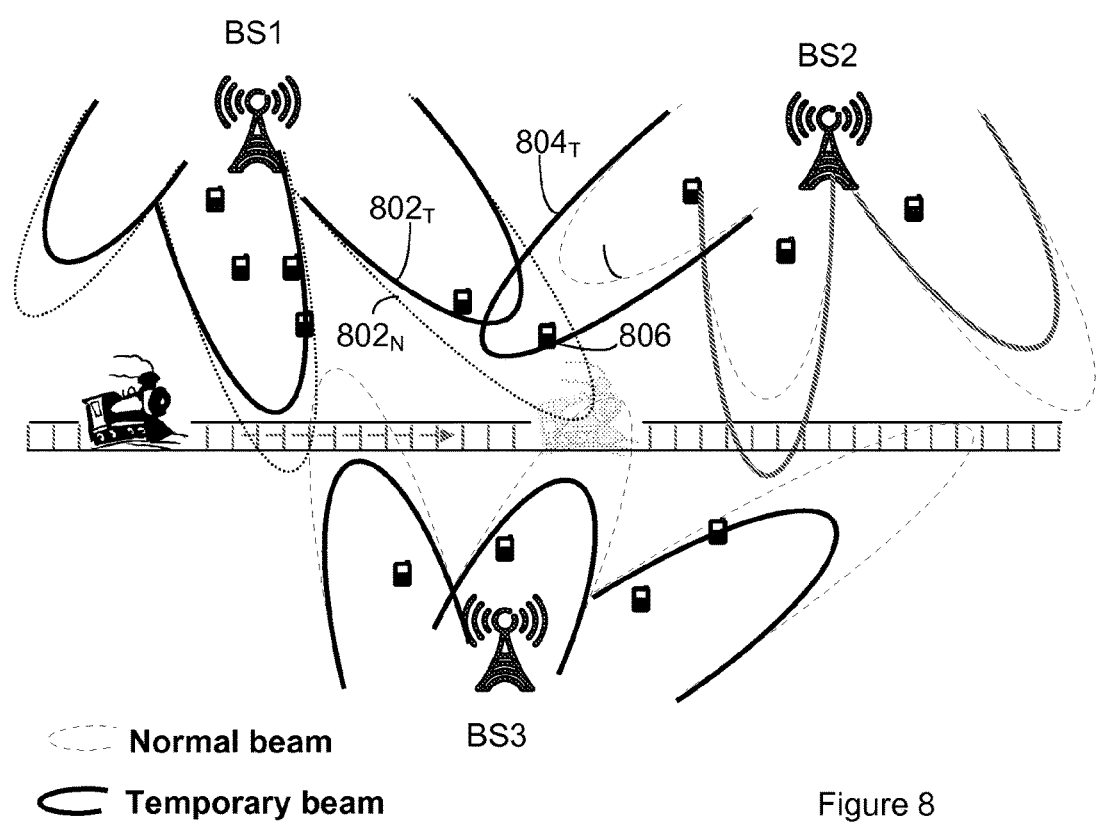
FIG. 8 is a schematic view illustrating, BSs of a system and the extension of the coverage of different cells of the BSs as a train is moving along a track, according to an exemplifying embodiment.

Alternatively or in addition, the transmit power of one or more nodes could be temporarily changed or dynamically adapted, such that an appropriate interference margin is achieved. However, such adaptations should be done in a controlled way, e.g. such that no UEs are suddenly signal-wise "abandoned" outside the signal coverage of the node in question. UEs which are difficult to continue to serve, e.g. when the out-of-band interference should be reduced, may e.g. be handed over to other nodes for continued service (load-sharing). An example of such a load-sharing mechanism is illustrated in FIG. 8, which will be described further below.

FIGS. 3-6c illustrate, schematically, the frequency spectrum of an ideal/real transmitter in a system A and the frequency spectrum of an ideal/real receiver in a system B, when applying different methods for interference-reduction in accordance with embodiments of the invention.

Figure 3:
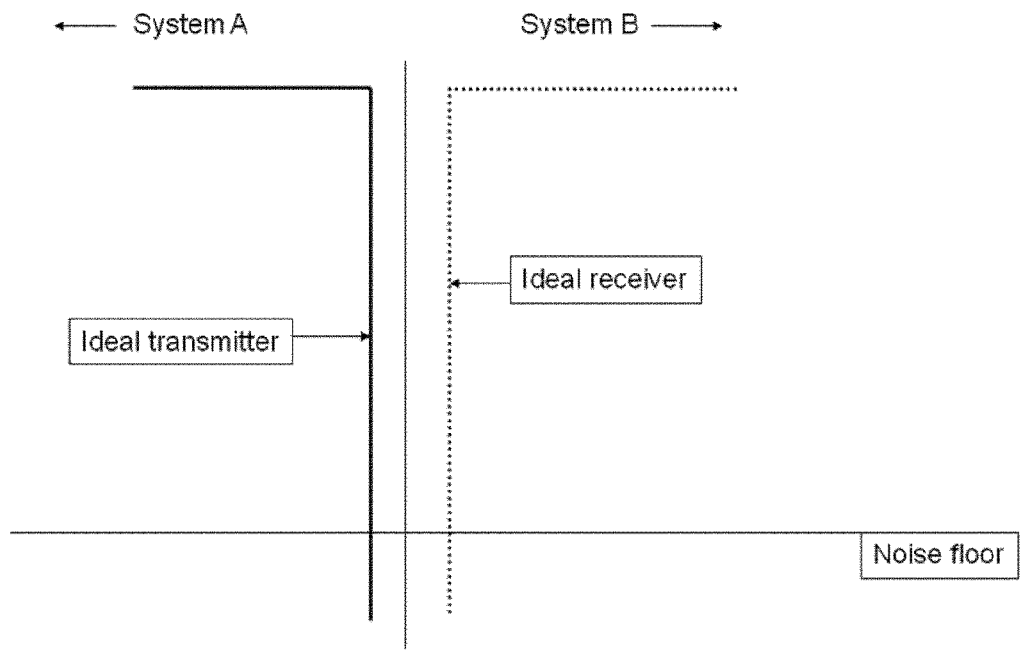
FIG. 3 is a diagram showing an ideal transmitter frequency spectrum (bold line) in a first system A, and an ideal receiver spectrum (dotted line) in a second system B.
Figure 4A:
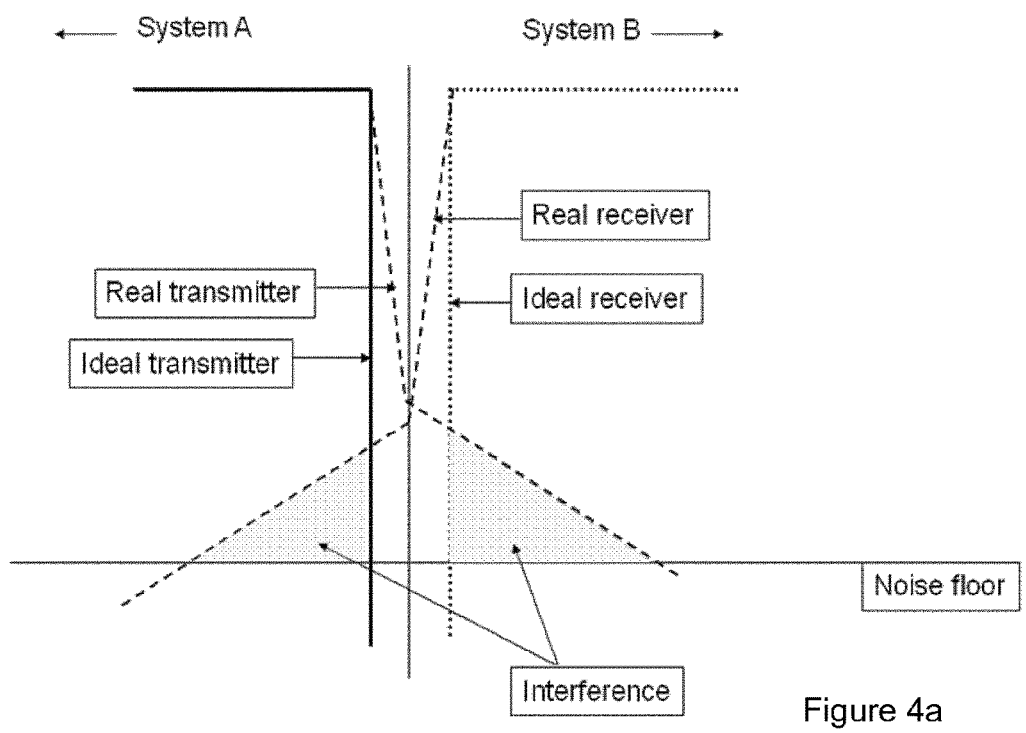
FIGS. 4a-4c are diagrams illustrating inter system interference from a real transmitter of a first system A to a real receiver of a second system B, according to the prior art (FIG. 4a) and according to different exemplifying embodiments (FIGS. 4b-4c).
Figure 4B:
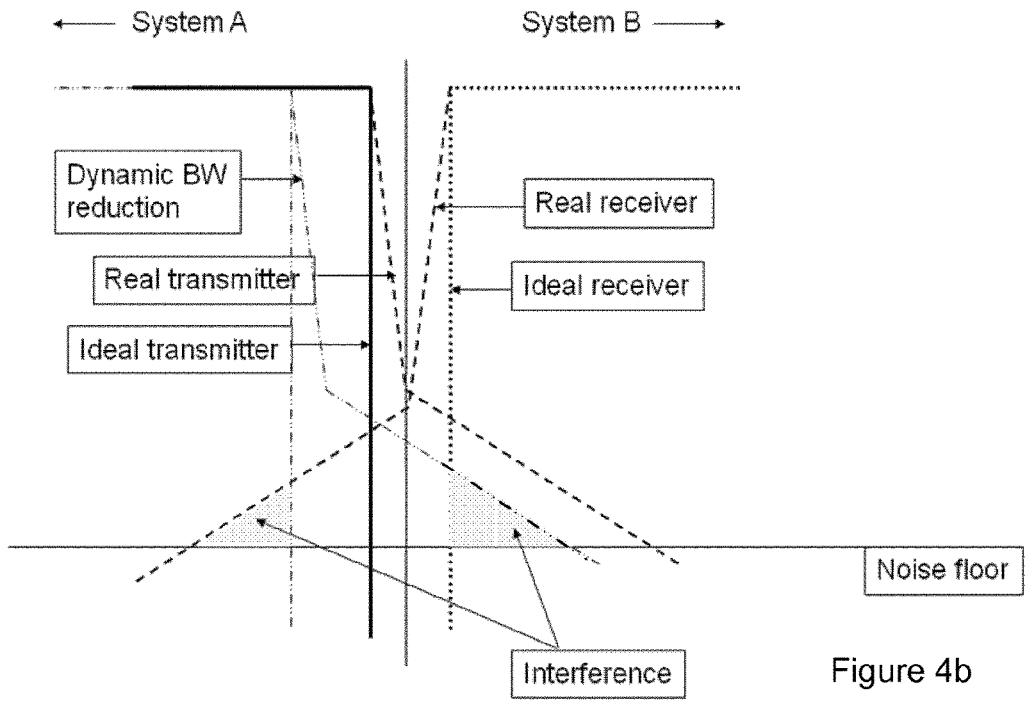
Figure 4C:
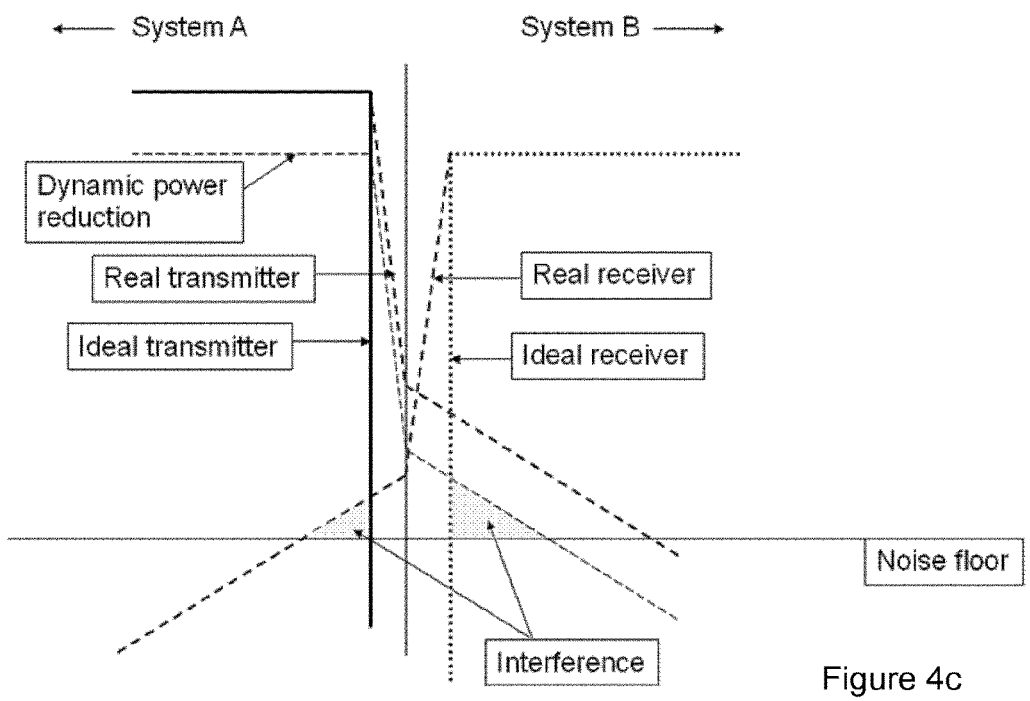

FIG. 3 illustrates the frequency spectrum of an ideal transmitter in a system A and an ideal receiver in a system B. In this ideal case illustrated in FIG. 3, there is no inter-system interference. However, a more realistic situation is illustrated in FIG. 4a, which also shows the frequency dependent emission spectrum of a real transmitter and the frequency dependent selectivity of a real receiver. In the situation illustrated in FIG. 4a, the inter-system interference has two relatively large contributions caused by the non-ideal behavior in the transmitter and the receiver. FIGS. 4b and 4c illustrate how the power spectrum of the transmitter of system A, and thus the mutual inter-system interference, changes when applying a dynamic bandwidth reduction (FIG. 4b) and a dynamic power reduction (FIG. 4c), respectively. Another alternative would be to combine bandwidth and power reduction (not illustrated). As can be seen when comparing the FIGS. 4a-4c, the shaded areas illustrating the interference is significantly smaller in FIGS. 4b and 4c than in 4a. Further, it appears as if, in this example, a dynamic power reduction is a more efficient alternative than a dynamic bandwidth reduction. However, the choice of optimum interference-reducing measure may, besides depending on actual transmitter and receiver characteristics, also depend on other factors, such as e.g. location of UEs within a cell (e.g. close to cell border or close to BS).

Figure 5A:
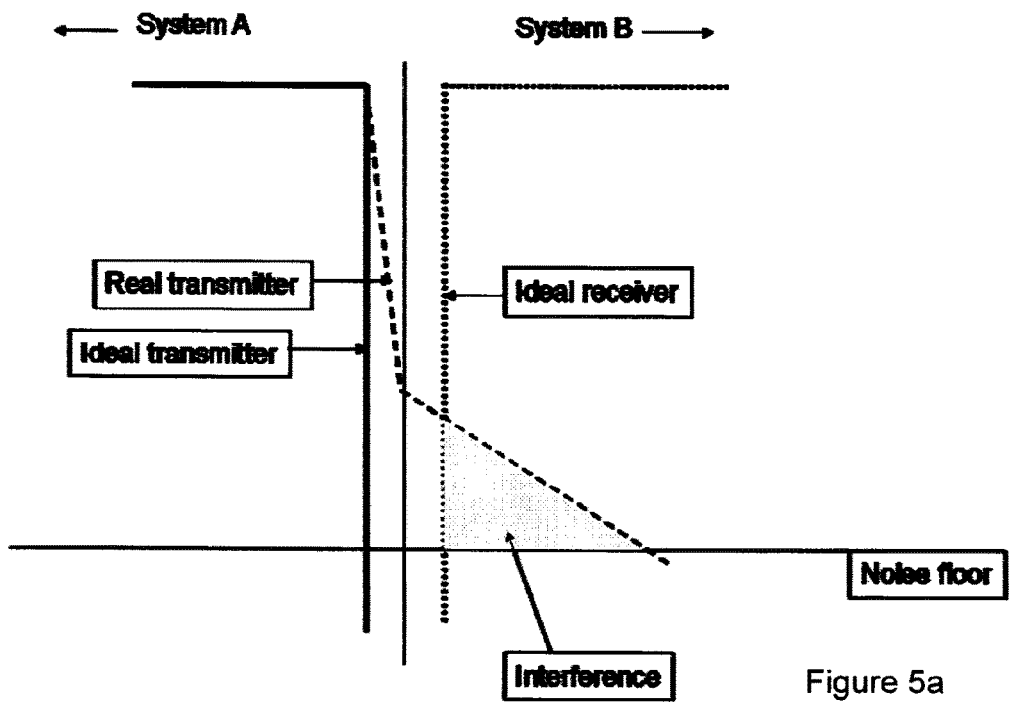
FIGS. 5a-5c are diagrams illustrating inter system interference from a real transmitter of a first system A to an ideal receiver of a second system B, according to the prior art (FIG. 5a) and according to different exemplifying embodiments (FIGS. 5b-5c).
Figure 5B:
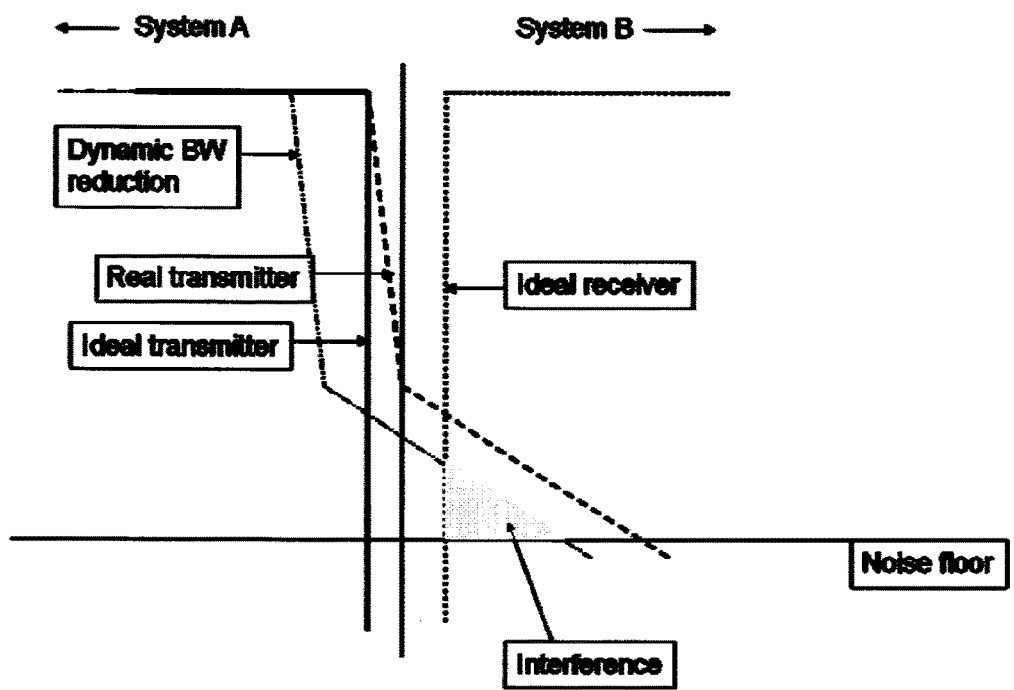
Figure 5C:
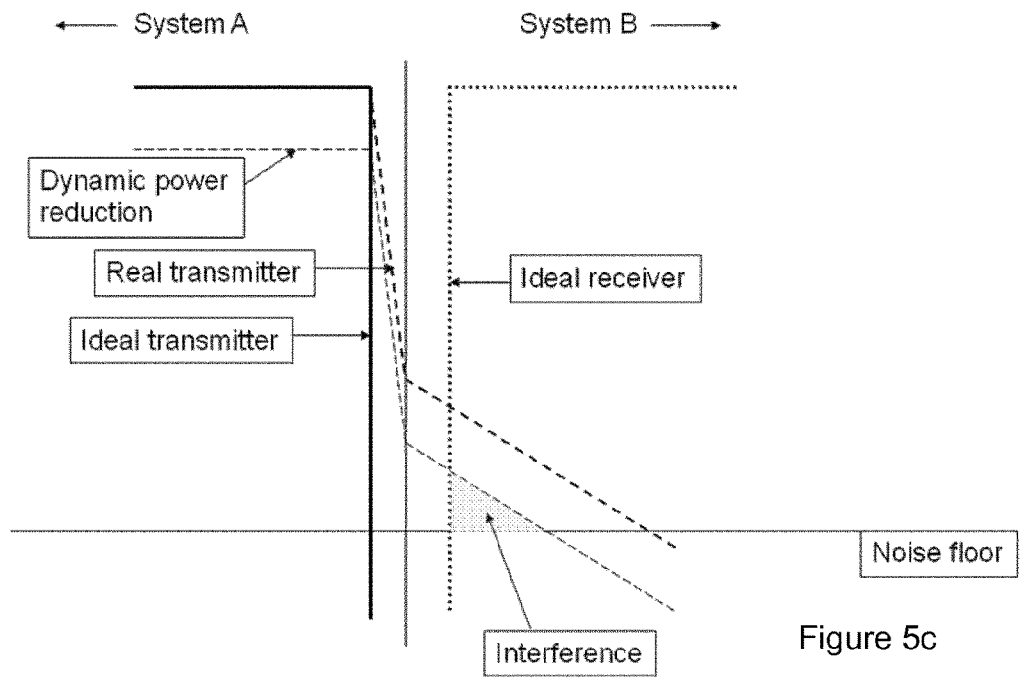
Figure 6A:
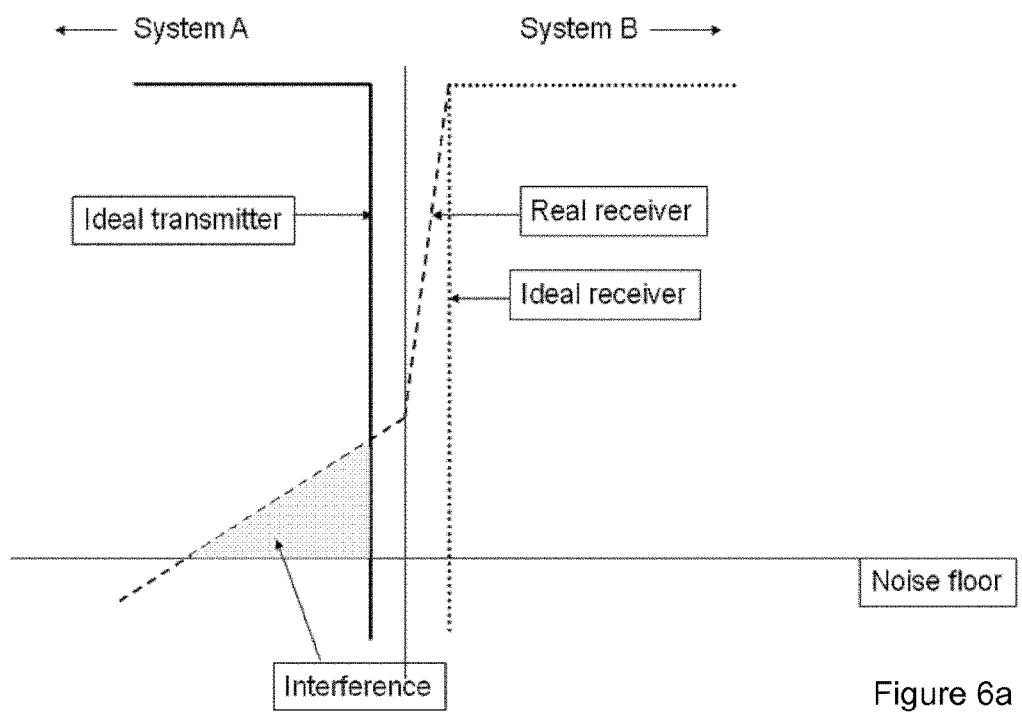
FIGS. 6a-6c are diagrams illustrating inter system interference from an ideal transmitter of a first system A to a real receiver of a second system B, according to the prior art (FIG. 6a) and according to different exemplifying embodiments (FIGS. 6b-6c).
Figure 6B:
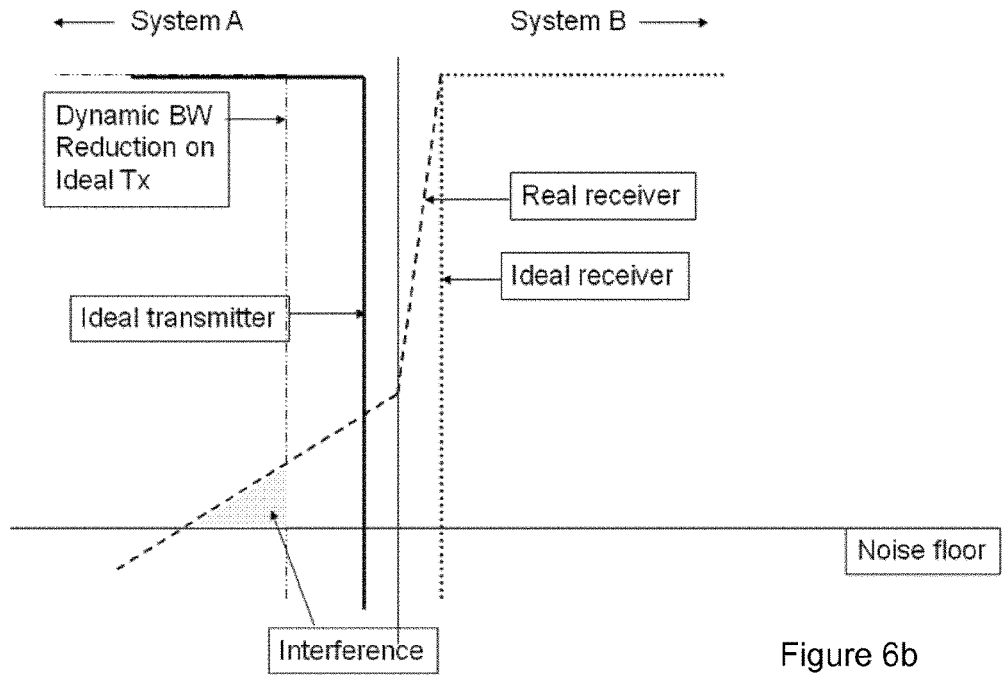
Figure 6C:
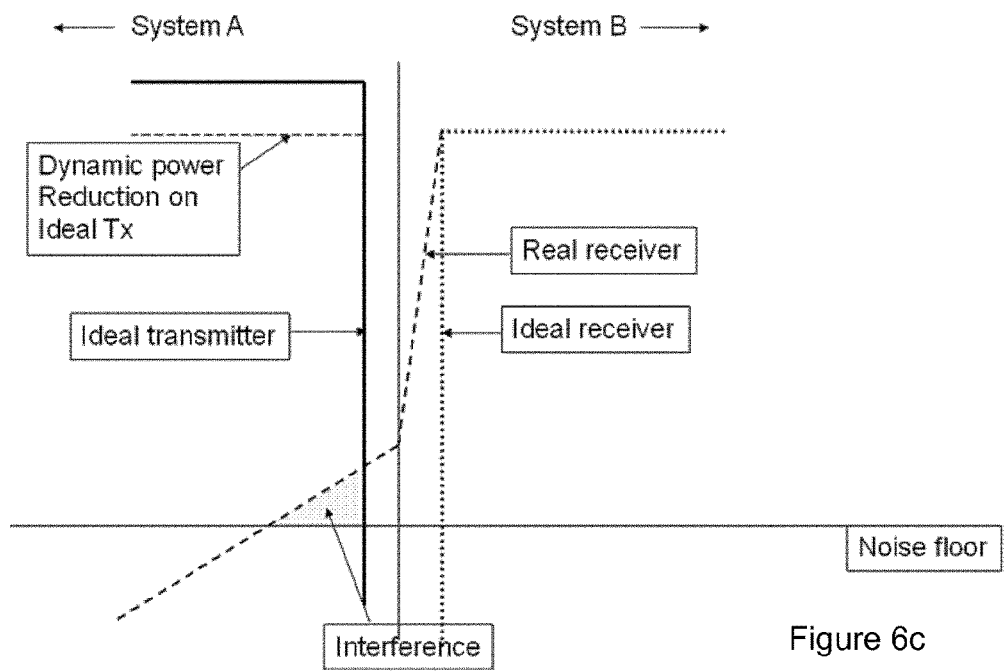

FIGS. 5a-c illustrate a part of what was illustrated in FIGS. 4a-4c, namely the inter-system interference caused by an non-ideal transmitter in system A towards system B and the effect of the dynamic bandwidth reduction (5b)/dynamic power reduction (5c) of the system-A-transmitter, on said interference from system A to system B. FIGS. 6a-6c, on the other hand, illustrate the inter-system interference from system A towards system B caused by system B's non-ideal receiver and the effect of the dynamic bandwidth reduction (6b)/dynamic power reduction (6c) of the system-A-transmitter, on said interference.

Figure 7A:
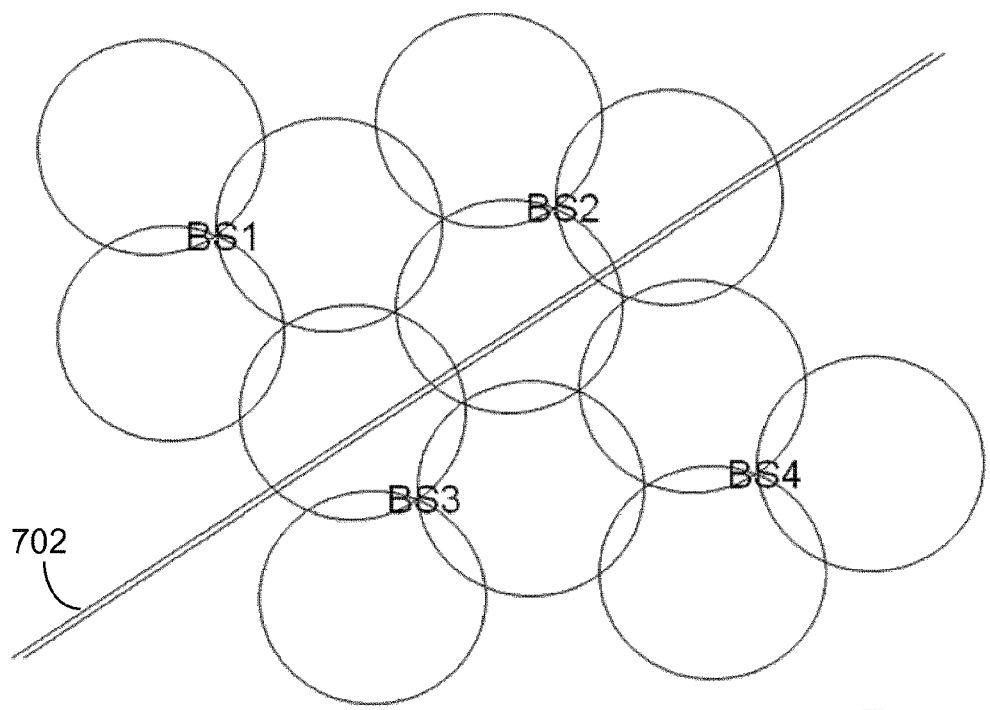
FIGS. 7a-7b are schematic views illustrating BSs of a system and the extension of the coverage of different cells of the BSs in absence of (FIG. 7a) and in presence of (FIG. 7b) a train, according to an exemplifying embodiment.
Figure 7B:
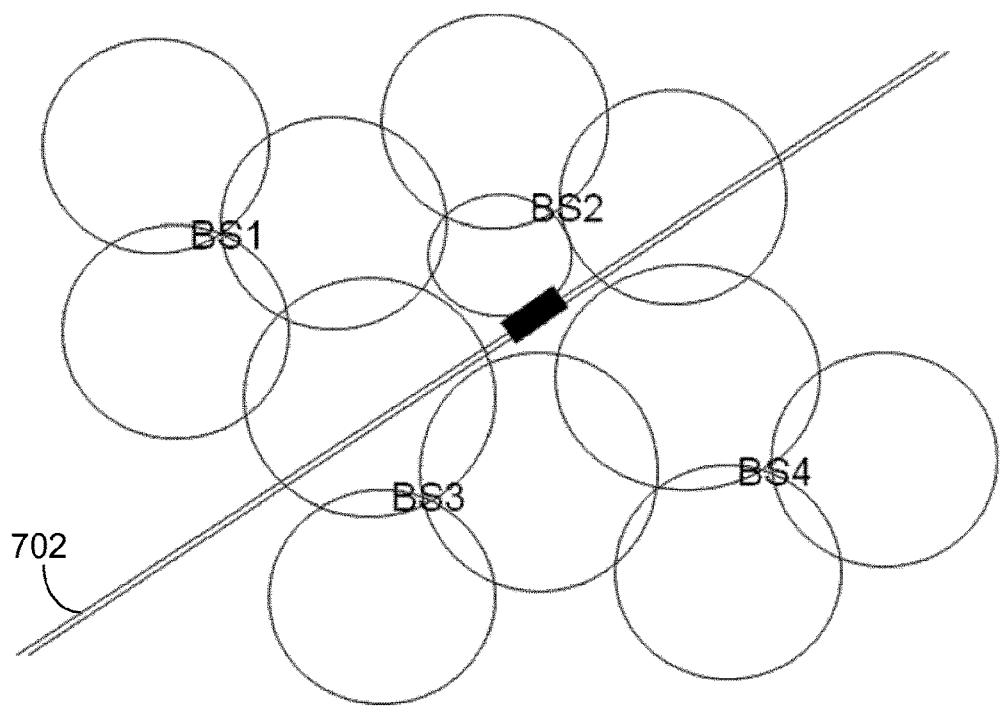

FIGS. 7a-7b illustrate a number of BSs of a first system, each BS generating a number of cells illustrated as circles, and a train track, 702, where trains pass by, which use a second, frequency-wise adjacent, system for communication. In FIG. 7a, no train is present, and thus the first system may use its transmission resources to a maximum. In FIG. 7b, however, a train is present, and the first system is adapted in consideration of the second system, by that one of the cells of BS2 is dynamically reduced while other BSs, BS3 and BS4, dynamically expends their coverage to a larger area covering the reductions made by BS2.

FIG. 8 illustrates three base stations in a communication system normally having permanent antenna lobes or beams as illustrated by the dotted lines. As can be seen in FIG. 8, these permanent beams point in the direction of train rails. When applying an exemplifying embodiment of the invention, if a train is approaching, the main lobes (beams) of the nearest base station BS1 are adjusted into temporary beams, so as not to create interference to the communication between the train control system and the train. These new adapted temporary beams are illustrated by the bold solid lines in FIG. 8. When the beams of BS1 are adapted, e.g. by redirection or reconfiguration, the beams of a neighbor base station BS2 may be adjusted, such as to cover areas which are left out of coverage due to the adaptation of the beams of BS1. For example, when beam 802N (dotted line) of BS1 is adapted into beam 802T (solid line) in order to avoid interfering with the train communication system, UE 806 is located outside the coverage of BS1. However, in order to continue to provide UE 806 with service, the beam 804N of BS2 is adapted into beam 804T, and the service of UE 806 is transferred to BS2 (load-sharing). When the train has passed by, the beams of BS1 and BS3 will go back to normal (802N, 804N) Similar adjustments of other beams may take place as the train moves along the track.

The use of adaptive antenna patterns and/or dynamic variation of transmit power can be combined e.g. with actions for adjusting the frequency spectrum, or frequency content, of the out-of-band interference. Moreover, the use of adaptive antenna patterns may improve the possibility of using COMP to improve throughput within LTE; e.g. cells with temporarily reduced bandwidth get more support from neighboring cells for the utilized bandwidth.

Further, adaptive filters may be used to achieve a dynamic response to an arising interference situation. One or more adaptive filters in the disturbing system could be used e.g. to suppress the out-of-band interference in accordance with the characteristics of, and the activity in, a disturbed system. The performance of the disturbing system may be somewhat degraded due to e.g. an increased out-of-band-interference suppression by use of adaptive filters. For example, the signal quality in communication within the disturbing system may be degraded by such suppression. However, when comparing the achievable effects of the available alternatives for reducing interference, adaptive filters may still be the preferable solution in some situations.

LTE BSs located within a geographical area close to an airport and/or train rails/tracks may be equipped with receivers so as to detect signals from airplanes and/or trains. Upon detection of a signal from an airplane or train, a temporary guard band may be applied, which is adjusted dynamically depending on the distance to the airplane/train. The received signal strength may be used so as to assess this distance to the airplane/train. On the basis of the estimated distance between an LTE BS and an airplane or train, the bandwidth of the temporary guard band may be assessed. In case the number of users in the cells with a low radio link quality is below a given number N (implying thus there are few or no users far from the BS), then the LTE BS can reduce its DL transmission power during a given period.

LTE BSs located within a geographical area in the proximity of an airport or train trails may communicate directly, e.g. either via cable, or via micro-wave links, with the airport control towers or with the traffic controllers of airplanes or trains, such that the LTE BSs can obtain information on the arrival of airplanes and their distance to the LTE BSs. Based on this information, temporary guard bands or temporary power reductions may be applied by these BSs.

LTE BSs implementing e.g. the first and/or second embodiment described above, can apply load balancing techniques so as to steer a part of the cell load to neighbor cells, whose controlling BSs do not interfere with the airplanes or trains, during the time period the temporary guard band is applied.

Implementing temporary modification of the system bandwidth may require that some practical problems resulting from a temporary system bandwidth reduction need to be resolved. One such problem is the channel estimation. Some adjustments or additions to e.g. standard specifications may be required. For example, if a system operating within a 20 MHz frequency channel is adjusted to temporarily operate within an 18 MHz frequency channel, the number of available Physical Resource Blocks (PRBs) is reduced. Thus, it should be seen to e.g. that the DL PDCCH can be properly carried within the remaining amount of PRBs. Organizations such as the 3GPP ($3^{rd}$ Generation Partnership Project) may for example need to specify performance requirements for this new amount of PRBs.

When modifying the operating bandwidth within a cell, information of this modification should be provided to e.g. mobile terminals camping on the cell, and to base stations in neighboring cells, at least when appropriate. Said mobile terminals may be notified of the change in operating bandwidth via e.g. the broadcast channel of the cell. Base stations in neighboring cells may be notified via e.g. the X2 or S1-interface.

In a first exemplifying embodiment, LTE base stations in the proximity of airports or of train rails/tracks, reduce their bandwidth temporarily upon detection of an approaching airplane or train, e.g. for a time period "Td". Such LTE BSs, which temporarily reduce their operational bandwidth, notify the users in their cells of that e.g. the upper part of the DL LTE bandwidth is not going to be used during a period Td. This notification can be done via broadcasting, or via explicit signaling. Upon reception of such a message, UEs in the affected cells, may refrain from performing measurements of RSRP (Reference Signal Received Power), RSRQ (Reference Signal Received Quality) and/or RSSI (Received Signal Strength Indicator) measurements on the part of the band which is not to be used for transmission during the time period Td. Said UEs may also refrain from performing CQI measurements in this part of the band. At least some of said measurements could, if possible, be performed on neighbor cells which have not restricted their frequency band in a similar manner. For example, a given cell A, in which the bandwidth has been temporarily reduced from 20 MHz to 18 MHz, has N neighbors. One of them, neighbor B, has also restricted its bandwidth in a similar manner from 20 MHz to 18 MHz. Another one of the N neighbors, neighbor C, has not restricted its bandwidth at all, (or has restricted its bandwidth in a different way than cells A & B, due to different, e.g. distance to the interfered system), and cell C thus has activity in the bandwidth which is not used by cells A&B (due to their bandwidth restriction). The UEs camping on cell A may then measure e.g. RSRP from cells A & B over e.g. 18 MHz, and the same UEs may measure RSRP from cell C over the whole bandwidth of 20 MHz. The same applies for RSRQ, RSSI.

In a second embodiment of the invention, macro eNBs with restricted bandwidth broadcast to UEs in their cells, that an upper band of the bandwidth is not used by PDCCH for channel allocations.

In a third embodiment of the invention, users scheduled according to semi-persistent scheduling (SPS) policy in DL, are temporarily not allocated or granted resources within this temporary guard band.

In LTE, the bandwidth over which a UE within a cell should perform measurements is specified to said UE e.g. by an eNB serving the UE. This specification is made by use of a parameter denoted "AllowedMeasBandwidth", which is broadcasted in the System Information Block 3 (SIB3), as it can be seen e.g. within 3GPP TS 36.331. However, the parameter "AllowedMeasBandwidth" can only assume the values 6, 12, 25, 50, and 100 RBs. Thus, only these alterative numbers of RBs can be used for measurements. In addition, these RBs are centered around the central RB.

An option would be to use the existing signaling, without any modification. For example, consider a cell near an airport having a bandwidth of 20 MHz (100 RBs). Upon detection of an airplane approaching, it is decided to use 17.5 MHz of the available bandwidth. The last 2.5 MHz of the upper/higher frequencies of the bandwidth are used as a temporary guard band. During the period when only 17.5 MHz of the 20 MHz are to be used for data transmission, measurements can be performed within the central 10 MHz (50 RBs). This option has drawbacks in that the granularity of the size of the temporary guard bands is limited. The guard band must always be less/narrower than half the channel bandwidth since the measurements are performed on frequencies in the center of the channel bandwidth.

In case a finer granularity is required, new values could be added to the list of allowed values for "AllowedMeasBandwidth", e.g. 94 and/or 88 RBs. In addition, it could be specified that some other RBs than the central 92 RBs should be used for measurements, e.g. the first 94 RBs, thus leaving the last 6 RBs temporarily unused.

Another option would be to add a delta, dlt, to the existing measurement configurations. As an example, in the case mentioned above, the value dlt could be equal to 2.5 MHz (i.e 12 RBs), to be removed from the upper band of the bandwidth.

In case the temporary guard band is combined with temporary power reduction in these bands, then the signaling related to the measurement bandwidth can be done via dedicated RRC signaling.

When the UE receives information about temporary guard band location and size measurements are adapted. This means that the measurement bandwidth during this period of Td cannot exceed the maximum bandwidth of operation during this period, e.g. RSRP, or RSRQ measurements can be done up to the maximum bandwidth of operation during this period. Any other bandwidth configuration below the operating bandwidth is possible. Channel State Information (CSI) should be measured on all the bandwidth that is available. The same applies for the demodulation. At the end of this period, Td, the UE goes back to its initial configuration.

Figure 9:
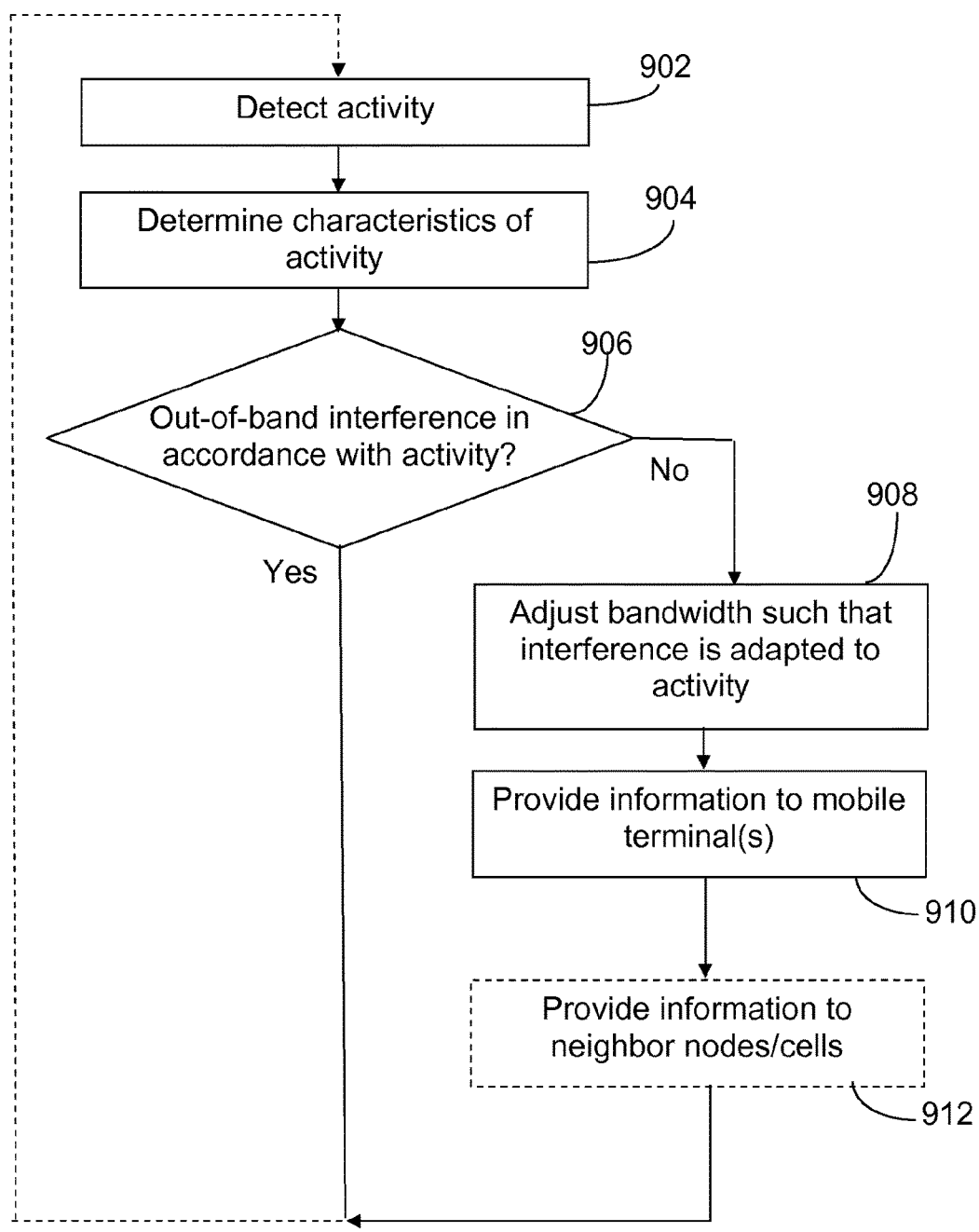
FIG. 9 is a flow chart illustrating a procedure in a node in a communication system, according to an exemplifying embodiment.

Exemplifying Procedure in Node, FIG. 9

An exemplifying embodiment of the procedure for avoiding or reducing interference in an adjacent frequency band will now be described with reference to FIG. 9. The procedure is to be performed in/by a network node, such as e.g. a base station, or other node in a first wireless communication system. The first communication system, also denoted the "disturbing system", is assumed to be associated with a first frequency band in which it operates. A second wireless system is assumed to be associated with a second frequency band, which is adjacent to the first frequency band, in which it operates. The first and the second frequency band may be separated by a third frequency band, which is not associated with the first or the second system.

The first communication system may be a system, such as e.g. UMTS (e.g. WCDMA), LTE or LTE-A, operated by a first operator or organization. The second system may be a "dedicated" wireless communication system, such as e.g. the previously mentioned DME, L-DACS or GSM-R, which are used for communication and control of airplanes and trains. The second system may alternatively be a system, such as e.g. UMTS, LTE or LTE-A, operated by a second operator or organization. The second system may further be a radar system comprising e.g. a geographically stationary node generating a rotating/sweeping radar beam; a system for broadcast or a satellite based system. The first and second systems are associated with adjacent frequency bands and that communication within the first system in the frequency band associated with the first system may cause interference in the frequency band associated with the second system, and thereby may interfere with the communication within the second system.

Initially, in a network node in the first system, activity of the second system in the second frequency band is detected in an action 902. In order to detect such activity, the network node could e.g. monitor the second frequency band by measuring signal energy in said second frequency band ,or, receive reports related to such measurements performed by some other node(s) in the first system, e.g. UE(s); and/or, receive and decode information communicated by the second system within said second frequency band. Alternatively or in addition, the network node could receive information related to activity in the second frequency band. Such information could be provided e.g. by the second system over an alternative communication link, such as e.g. a microwave link or via wired communication. The information provided by the second system could relate to e.g. one or more of: the geographical position of one or more mobile nodes in the second system; the movement pattern of one or more nodes in the second system, a time schedule of a node in the second system and receiver characteristics of one or more nodes in the second system.

One example of a receiver characteristic is the blocking capability. For example, a given receiver might be able to handle/reduce/cut interference from a neighbor frequency band (at a distance of e.g. 1.25 MHz) up to 60 dB, whilst another receiver might be less powerful and only be able to cut/remove interference from the same neighbor band at a level of 40 dB. Such information on the interfered (second) system could be made known to the interfering (first) system, such that the interfering system can determine an adequate level of e.g. bandwidth and/or transmission power reduction.

From information obtained e.g. in one or more of the ways described above, the network node is able to detect activity of the second system in the second frequency band. The characteristics of the current activity in the second frequency band is then determined in an action 904, e.g. by analysis of performed measurements or other obtained information.

Thus, when having determined the characteristics of the current activity of the second system in the second frequency band, it may be determined in an optional action 906, if the out-of-band interference caused by communication associated with the network node, i.e. DL from the network node and/or UL to the network node, is in accordance with the characteristics of the current activity of the second system in the second frequency band, or if the out-of-band interference should be reduced or may be increased (within allowed boundaries). By "being in accordance with" is here meant that the out-of-band interference fulfils predefined requirements of to which extent out-of-band interference from the first system may interfere with the second system, while, at the same time, the radio resources in the first system are utilized e.g. to a sufficiently high extent or to an as high extent as possible. That is, the out-of-band interference should not be as high or strong as to interfere with the second system activity, but neither be suppressed to an unnecessarily low level.

Thus, when appropriate, the bandwidth used for radio communication by the node is adjusted in an action 908, such that the interference to the second frequency band from radio communication associated with the network node is adapted to the second system activity in said second frequency band. Further, information related to the bandwidth adjustment is provided to at least one mobile terminal served by the node, in an action 910, thus enabling continued service of said at least one mobile terminal.

The information related to the bandwidth adjustment may comprise an indicator of an allowed measurement bandwidth, selected based on the adjusted bandwidth, to the mobile terminal. The information may further comprise a specification of a location of the allowed measurement bandwidth.

The node may further provide information related to the bandwidth adjustment to neighbor nodes, such as e.g. BSs, e.g. via the X2 or S1 interface, in an action 912.

Figure 10:
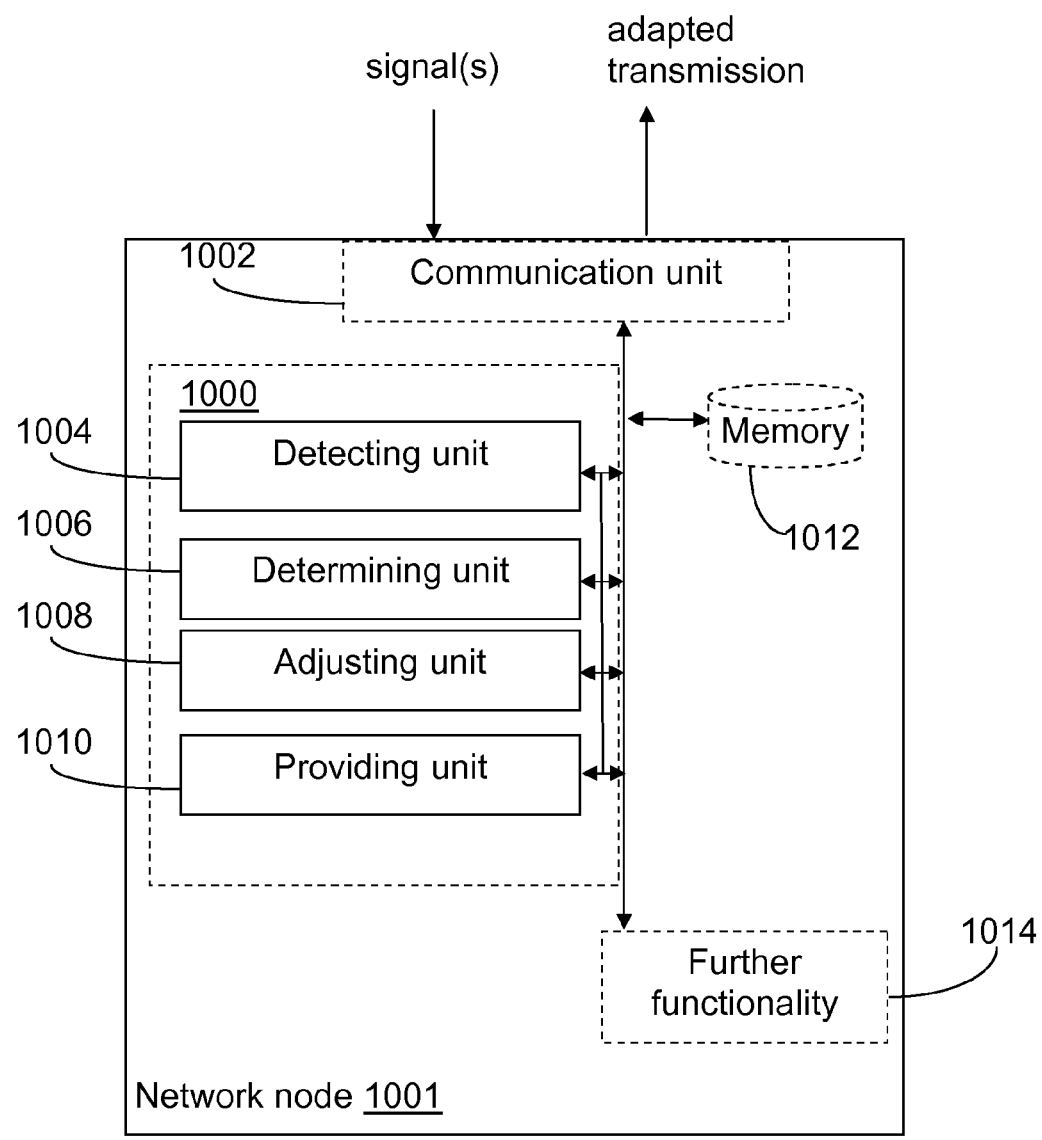
FIG. 10 is a block diagram illustrating an arrangement in a node in a communication system, according to an exemplifying embodiment.

Exemplifying Arrangement in a Node, FIG. 10

Below, an exemplifying arrangement 1000, adapted to enable the performance of the above described procedure of avoiding or reducing interference in an adjacent frequency band will be described with reference to FIG. 10. The arrangement is suitable for use in, and is illustrated as being located/integrated in, a network node 1001, such as e.g. a base station, or other node in a first communication system being associated with a first frequency band, in which the first system operates. The arrangement 1000 is further illustrated as to communicate with other entities via a communication unit 1002, which may be considered to comprise conventional means for wireless and/or wired communication. The arrangement and/or node may further comprise other functional units 1014, such as e.g. adaptive filters, antenna control mechanisms and/or functional units providing regular base station functions, such as e.g. serving mobile terminals. The arrangement and/or node may further comprise one or more storage units 1012. The first and second system may be of various types, as previously described in conjunction with FIG. 9.

The arrangement 1000 comprises a detecting unit 1004, which is adapted to detect activity of a second system in a second frequency band, which is adjacent to the first frequency band. For example, the detecting unit could be adapted to monitor the second frequency band by measuring signal energy in said second frequency band; by receiving and decoding information communicated by the second system within said second frequency band; Alternatively receive or retrieve information related to the activity in the second frequency band, which information could be received or retrieved e.g. from the second system over an alternative communication link, such as e.g. a microwave link or via wired communication link.

The arrangement further comprises a determining unit 1006, which is adapted to determine the characteristics of the second system current activity in the second frequency band. Said characteristics could relate to one or more of e.g.: which frequencies that are used by the second system for transmission and/or reception, and to which extent; the time period during which the activity is expected to proceed; the expected development of the activity; a periodicity of the activity; and, the geographical extension of the activity. "Expected development" may relate to factors such as e.g. modulation format or modulation concept used by the second system.

The arrangement, e.g. the determining unit 1006 or some additional optional unit, may further be adapted to determine whether the interference to the second frequency band fulfills a predefined requirement, given the characteristics of the second system activity in the second frequency band. The predefined criterion may relate to an acceptable level of interference in the frequencies within the second frequency band, which are affected by the second system activity. The predefined criterion may e.g. be based on regulations regarding allowed levels of out-of-band interference and/or on the result of negotiations between e.g. different operators. Such regulations may be related to "blocking" and/or Adjacent Channel Leakage Ratio (ACLR). For HSPA (High Speed Packet Access) and LTE, for example, information related to such allowed levels may be found in 3GPP specifications.

Thus, the arrangement may be adapted to adjust the bandwidth such that the interference to the second frequency band is reduced when it is determined that the interference does not fulfill the predefined criterion, and thus potentially interferes with the second system activity; and to adjust the bandwidth such that the interference to the second frequency band is maintained or increased when it is determined that the interference fulfills the predefined criterion.

The arrangement further comprises an adjusting unit 1008, which is adapted to adjust the bandwidth used for radio communication by the network node, based on said characteristics, such that the interference to the second frequency band is adapted to the second system activity in said second frequency band. The arrangement further comprises a providing unit 1010, adapted to provide information related to the bandwidth adjustment to at least one mobile terminal served by the node, thus enabling continued service of said at least one mobile terminal. The information could be provided e.g. via a broadcast channel and/or via dedicated signaling. Further, the arrangement, e.g. the providing unit could be adapted to provide information related to the bandwidth adjustment to at least one neighboring node, such as e.g. a BS in a neighbor cell. Such information could be provided via e.g. the X2 interface or the S1 interface.

The neighbor node(s) might also, when being informed of such a bandwidth adjustment, instruct the UEs served by said neighbor node(s) to make adjustments of the bandwidth over which said UEs perform measurements; especially measurements of RSSI. That is, the UEs may be instructed e.g. to only measure RSSI over a part of the system bandwidth, instead of over the whole system bandwidth. If some neighbor cells of a cell, A, for which (A) the operation bandwidth is temporarily restricted e.g. from 20 MHz to 18 MHz, are not restricting their operation bandwidth, UEs which would normally perform measurements on the cell which is now temporarily restricted may instead perform measurements on another "unrestricted" neighbor cell, at least for the part of the bandwidth which is restricted or "missing" at cell A.

The functional units described above may be implemented in software and/or hardware, depending on e.g. preference.

Figure 11:
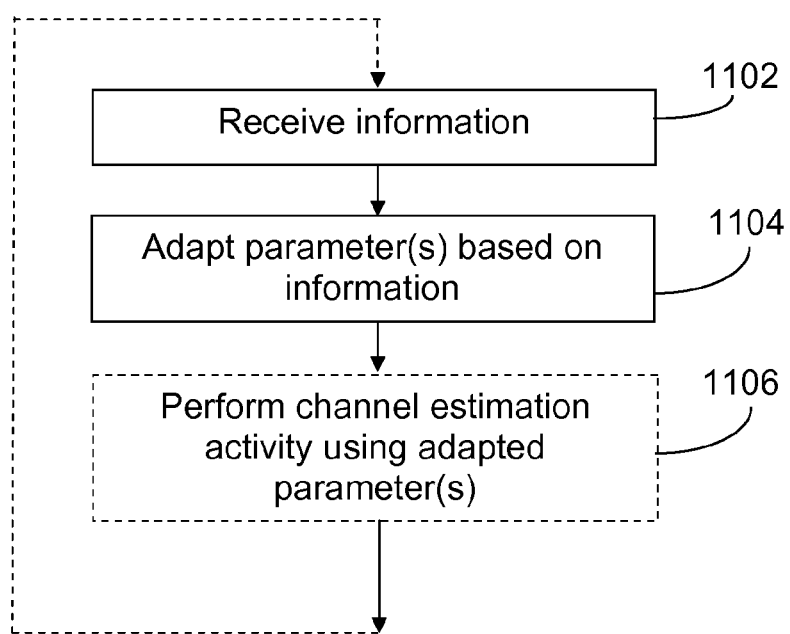
FIG. 11 is a flow chart illustrating a procedure in a mobile terminal in a communication system, according to an exemplifying embodiment.

Exemplifying Procedure in a Mobile Terminal, FIG. 11

An exemplifying embodiment of the procedure for supporting and enabling avoiding or reducing interference in an adjacent frequency band will now be described with reference to FIG. 11. The procedure is to be performed in/by a mobile terminal or UE in a first wireless communication system. The first communication system, also denoted the "disturbing system", is, as previously described in conjunction with FIG. 9, assumed to be associated with a first frequency band in which it operates. A second wireless system is assumed to be associated with a second frequency band, which is adjacent to the first frequency band, in which it operates. The first and the second frequency band may be separated by a third frequency band, which is not associated with the first or the second system. Further characteristics of the first and second system have been previously described.

Information is received in an action 1102. The information is received from a node serving the mobile terminal, and relates to an adjustment of the bandwidth used for communication by said node. Then, at least one parameter related to channel estimation is adapted based on the received information, in an action 1104. The at least one parameter which is adjusted could be e.g. the measurement bandwidth in which the mobile terminal performs e.g. RSRP/RSRQ/RSSI measurements for channel estimation, and/or the location of the measurement bandwidth.

Figure 12:
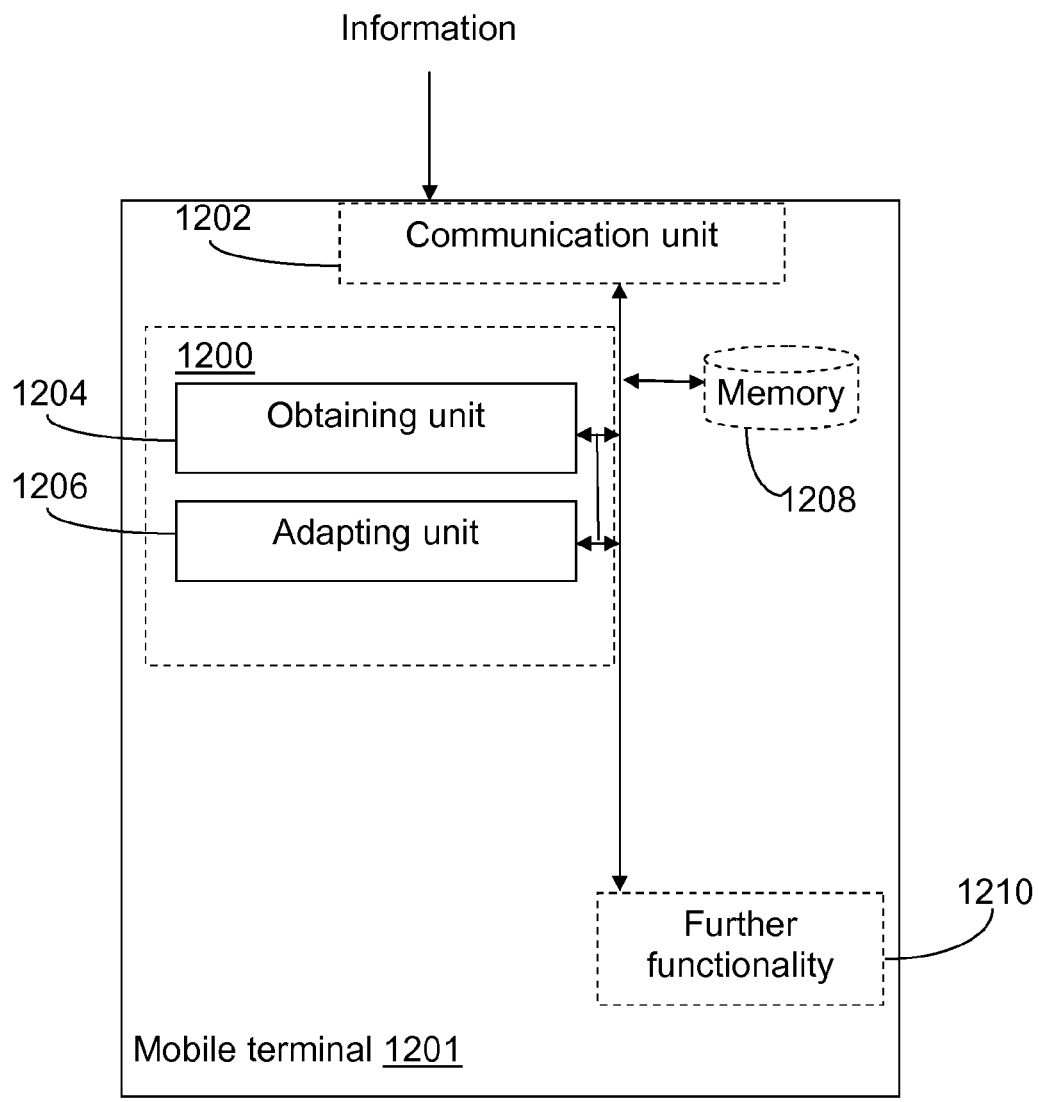
FIG. 12 is a block diagram illustrating an arrangement in a mobile terminal in a communication system, according to an exemplifying embodiment.

Exemplifying Arrangement in a Mobile Terminal, FIG. 12

Below, an exemplifying arrangement 1200, adapted to enable the performance of the above described procedure of supporting avoiding or reducing interference in an adjacent frequency band will be described with reference to FIG. 12. The arrangement is suitable for use in, and is illustrated as being located/integrated in, a mobile terminal 1201, such as e.g. a base station, or other node in a first communication system being associated with a first frequency band, in which the first system operates. The arrangement 1200 is further illustrated as to communicate with other entities via a communication unit 1202, which may be considered to comprise conventional means for wireless communication. The arrangement and/or mobile terminal may further comprise other functional units 1210, such as e.g. adaptive filters, antenna control mechanisms and/or functional units providing regular base station functions, such as e.g. serving mobile terminals. The arrangement and/or mobile terminal may further comprise one or more storage units 1208. The first and second system may be of various types, as previously described e.g. in conjunction with FIG. 9.

The arrangement 1200 comprises an obtaining unit 1204, adapted to receive information related to an adjustment of the bandwidth used for communication by a node serving the mobile terminal. The information could be provided by, and thus received from, a node serving the mobile terminal, which serving node has adjusted the bandwidth in which it communicates/operates. The information could be provided e.g. in form of a parameter like the "AllowedMeasBandwidth" in e.g. a SIB, as previously mentioned. Alternatively, the information could comprise an explicit indication of the operational bandwidth after bandwidth adjustment, or, be provided as a delta value, indicating e.g. the bandwidth withdrawn from the original operational bandwidth.

The arrangement further comprises an adapting unit 1206, adapted to adapt at least one parameter related to channel estimation, based on the received information. As previously described, the bandwidth used by the mobile terminal for performing measurements, such as RSRP, RSRQ and/or RSSI measurements could be adjusted such that no measurements are performed over frequencies which are not used by the serving node for communication.

The functional units described above may be implemented in software and/or hardware, depending on e.g. preference.

Figure 13:
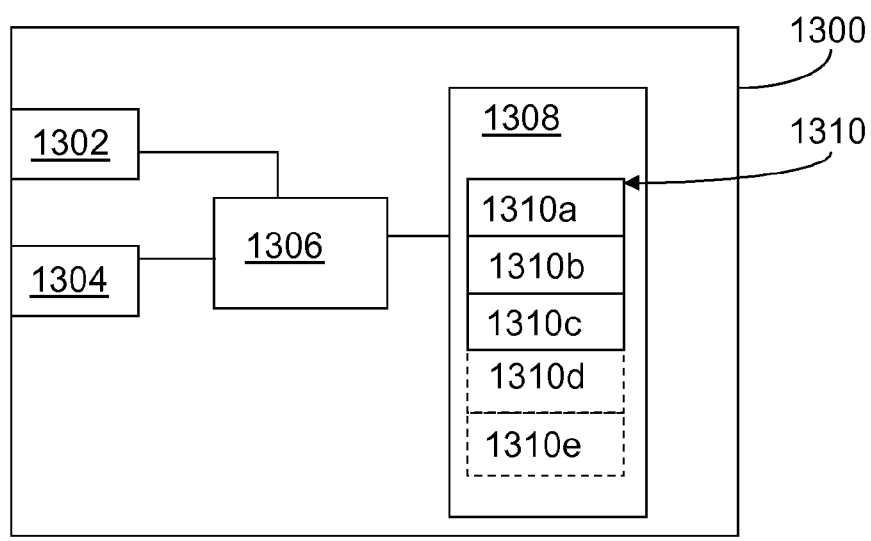
FIG. 13 is a block diagram illustrating an arrangement, according to an exemplifying embodiment.

Exemplifying Arrangement, FIG. 13

FIG. 13 schematically shows an embodiment of an arrangement 1300 in a network node or a mobile terminal, which also can be an alternative way of disclosing an embodiment of the arrangement in a network node illustrated in FIG. 10 or the one in a mobile terminal illustrated in FIG. 12. Comprised in the arrangement 1300 are here a processing unit 1306, e.g. with a DSP (Digital Signal Processor). The processing unit 1306 may be a single unit or a plurality of units to perform different actions of procedures described herein. The arrangement 1300 may also comprise an input unit 1302 for receiving signals from other entities, and an output unit 1304 for providing signal(s) to other entities. The input unit 1302 and the output unit 1304 may be arranged as an integrated entity.

Furthermore, the arrangement 1300 comprises at least one computer program product 1308 in the form of a non-volatile memory, e.g. an EEPROM (Electrically Erasable Programmable Read-Only Memory), a flash memory and a hard drive. The computer program product 1308 comprises a computer program 1310, which comprises code means, which when executed in the processing unit 1306 in the arrangement 1300 causes the arrangement and/or the network node or mobile terminal to perform the actions of the procedure described earlier in conjunction with the respective FIGS. 9 and 11.

The computer program 1310 may be configured as a computer program code structured in computer program modules. Hence, in an exemplifying embodiment of an arrangement for use in a node, the code means in the computer program 1310 of the arrangement 1300 comprises a detecting module 1310a for detecting activity in an adjacent frequency band. The computer program further comprises a determining module 1310b for determining the characteristics of any detected activity in the adjacent frequency band. The computer program 1310 further comprises an adjusting module 1310c for adjusting the bandwidth used for communication by the node, based on the characteristics of the activity, such that interference to the second frequency band, from radio communication associated with the network node, is adapted to the second system activity in said second frequency band. The computer program 1310 further comprises a providing module 1310d for providing information related to the bandwidth adjustment to at least one mobile terminal served by the node. The computer program 1310 could further comprise other modules 1310e for providing other desired functionality.

If instead describing an exemplifying embodiment of an arrangement for use in a mobile terminal with reference to FIG. 13, the code means in the computer program 1310 of the arrangement 1300 comprises an obtaining module 1310a for receiving information related to an adjustment of the bandwidth used for communication by a node serving the mobile terminal. The computer program further comprises an adapting module 1310b for adapting at least one parameter related to channel estimation, based on the received information. Also in this example, the computer program could comprise other modules, e.g. 1310c-e for providing other desired functionality.

The modules 1310a-d/1310a-b in the examples above could essentially perform the actions of the flows illustrated in FIGS. 9 and 11, to emulate the respective arrangements in a node and a mobile terminal illustrated in FIG. 10 and FIG. 12, respectively. In other words, when the different modules 1310a-d/1310a-b in the examples above are executed in the processing unit 1306, they may correspond to the units 1004-1008 of FIG. 10 or the units 1204-1206 in FIG. 12.

Although the code means in the embodiment disclosed above in conjunction with FIG. 13 are implemented as computer program modules which when executed in the processing unit causes the arrangement and/or network node to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the network node.

While the procedure as suggested above has been described with reference to specific embodiments provided as examples, the description is generally only intended to illustrate the inventive concept and should not be taken as limiting the scope of the suggested methods and arrangements, which are defined by the appended claims. While described in general terms, the methods and arrangements may be applicable e.g. for different types of communication systems, using commonly available communication technologies using different power and/or bandwidth, such as e.g. WCDMA, LTE, LTE-A, WiMAX (Worldwide Interoperability for Microwave Access), GSM, UMTS, radar systems, satellite systems or broadcast technologies.

It is also to be understood that the choice of interacting units or modules, as well as the naming of the units are only for exemplifying purpose, and client and server nodes suitable to execute any of the methods described above may be configured in a plurality of alternative ways in order to be able to execute the suggested process actions.

It should also be noted that the units or modules described in this disclosure are to be regarded as logical entities and not with necessity as separate physical entities.

The invention claimed is:

1. A method in a serving node in a first system associated with a first frequency band for radio communication for avoiding or reducing interference in a second frequency band associated with a second system and adjacent to the first frequency band, the method comprising:
   detecting activity of the second system in the second frequency band, determining characteristics of the second system current activity in the second frequency band, said serving node adjusting the bandwidth used by said serving node for transmitting data to a plurality of wireless communication devices (WCDs) served by said serving node, the adjustment of said bandwidth being based on said determined characteristics such that interference to the second frequency band from radio transmission from the serving node is adapted to the second system activity in said second frequency band, and said serving node providing to at least one of said plurality of WCDs served by the serving node information related to said adjustment of the bandwidth used by said serving node for transmitting data to said plurality of WCDs, thus enabling continued service of said at least one WCD.

2. The method according to claim 1, wherein the information related to the bandwidth adjustment comprises one or more of:

an indicator of an allowed measurement bandwidth, selected based on the adjusted bandwidth, for the at least one WCD, an indicator of the bandwidth used for communication by the serving node after the adjustment, and an indicator of the absolute or relative change in bandwidth.

3. The method according to claim 2, wherein the information related to the bandwidth adjustment further comprises a specification of a location of one or more of:

the allowed measurement bandwidth, the bandwidth used for communication by the serving node after the adjustment, and a frequency band which will no longer be used for communication by the serving node after the bandwidth adjustment.

4. The method according to claim 1, wherein the information related to the bandwidth adjustment is provided to at least one neighbor node, such that said neighbor node may provide information related to the bandwidth adjustment to at least one mobile terminal served by said neighbor node, thus enabling continued service of said at least one mobile terminal.

5. The method of claim 1, wherein detecting activity of the second system in the second frequency band comprises the serving node in the first communication system receiving a measurement report transmitted by one of the plurality of WCDs, said measurement report comprising information related to a measured signal energy in said second frequency band.

6. The method of claim 1, wherein detecting activity of the second system in the second frequency band comprises the serving node in the first communication system measuring signal energy in said second frequency band.

7. The method of claim 1, wherein detecting activity of the second system in the second frequency band comprises the serving node in the first communication system receiving and decoding information communicated by the second communication system within said second frequency band.

8. A method in a mobile terminal in a first system associated with a first frequency band for radio communication, for supporting avoiding or reducing interference in a second frequency band associated with a second system and adjacent to the first frequency band, the method comprising:

receiving, at the mobile terminal, information transmitted by a node serving the mobile terminal, said information being related to a bandwidth adjustment made by said node serving the mobile terminal, said bandwidth adjustment comprising an adjustment of a bandwidth used by said node for communication, and adapting at least one parameter related to channel estimation based on the received information.

9. The method according to claim 8, wherein the at least one adapted parameter is one or more of: the measurement bandwidth in which the mobile terminal performs measurements for channel estimation, and the location of the measurement bandwidth.

10. An apparatus in a first system associated with a first frequency band for radio communication, for supporting avoiding or reducing interference in a second frequency band associated with a second system and adjacent to the first frequency band, the apparatus comprising:

a detecting unit adapted to detect activity of the second system in the second frequency band, a determining unit adapted to determine the characteristics of the second system current activity in the second frequency band, an adjusting unit adapted to adjust at the bandwidth used by the apparatus for transmitting data to wireless communication devices (WCDs) served by said apparatus, based on said characteristics, such that the interference to the second frequency band is adapted to the second system activity in said second frequency band, and a providing unit adapted to provide to at least one WCD served by the apparatus information related to the adjustment of the bandwidth used by said apparatus for transmitting data to the plurality of WCDs, thus enabling continued service of said at least one mobile terminal.

11. The apparatus according to claim 10, wherein information related to the bandwidth adjustment is provided to at least one neighbor base station.

12. A base station comprising the apparatus according to claim 10.

13. An apparatus in a first system associated with a first frequency band for radio communication, for supporting avoiding or reducing interference in a second frequency band associated with a second system and adjacent to the first frequency band, the apparatus comprising:

an obtaining unit adapted to receive information related to a bandwidth adjustment made by a node serving the apparatus, said bandwidth adjustment comprising an adjustment of a bandwidth used for communication by said node serving the apparatus, an adapting unit adapted to adapt at least one parameter related to channel estimation based on the received information.

14. A mobile terminal comprising the apparatus according to claim 13.

* * * * *